(12) United States Patent
Hjelmberg et al.

(10) Patent No.: US 9,694,315 B2
(45) Date of Patent: Jul. 4, 2017

(54) GAS CLEANING SYSTEM HAVING A GAS FLOW RECTIFIER

(75) Inventors: Anders Erik Martin Hjelmberg, Vaxjo (SE); Ali Mustapha Tabikh, Vaxjo (SE)

(73) Assignee: General Electric Technology GmbH, Baden (CH)

( * ) Notice: Subject to any disclaimer, the term of this patent is extended or adjusted under 35 U.S.C. 154(b) by 236 days.

(21) Appl. No.: 13/817,790

(22) PCT Filed: Aug. 16, 2011

(86) PCT No.: PCT/IB2011/001885
§ 371 (c)(1),
(2), (4) Date: Mar. 8, 2013

(87) PCT Pub. No.: WO2012/023025
PCT Pub. Date: Feb. 23, 2012

(65) Prior Publication Data
US 2013/0224081 A1    Aug. 29, 2013

(30) Foreign Application Priority Data

Aug. 19, 2010    (EP) .................................... 10173432

(51) Int. Cl.
*B01D 50/00*    (2006.01)
*B01D 53/34*    (2006.01)
(Continued)

(52) U.S. Cl.
CPC ............. *B01D 53/34* (2013.01); *B01D 45/08* (2013.01); *B01D 46/10* (2013.01); *B01D 50/002* (2013.01);
(Continued)

(58) Field of Classification Search
CPC ... B01D 50/002; B01D 45/08; B01F 3/04049; F01N 3/2066; F01N 2330/38
(Continued)

(56) References Cited

U.S. PATENT DOCUMENTS 2,641,331 A    6/1953 Hudson
3,467,365 A    9/1969 Webster
(Continued)

FOREIGN PATENT DOCUMENTS

EP          0328419 A1      8/1989
WO          0003795 A1      1/2000
WO      2005114053 A1      12/2005

OTHER PUBLICATIONS

Oshinowo L, Kuhn D, "Turbulence decay behind expanded metal screens", The Canadian Journal of Chemical Engineering, Dec. 31, 2000, pp. 1032-1039, vol. 78, No. 6.
(Continued)

*Primary Examiner* — Tom P Duong
(74) *Attorney, Agent, or Firm* — GE Global Patent Operation; Rita D. Vacca (57) ABSTRACT

The present disclosure deals with a gas cleaning system (1) for cleaning process flue gas. The gas cleaning system (1) comprises a reactor inlet duct (13) having a longitudinal axis and a reactor duct (14) fluidly connected perpendicularly to the reactor inlet duct and positioned downstream from the reactor inlet duct. The reactor duct likewise has a longitudinal axis. Within the reactor duct is a gas cleaning device (20), such as a catalytic reactor, and a gas flow rectifier (30) for rectifying flue gas flow from the reactor inlet duct (13) into the reactor duct (14). The gas flow rectifier is arranged in the reactor duct upstream of the gas cleaning device (20), wherein the gas flow rectifier (30) comprises at least one expanded screen (30*a*).

13 Claims, 5 Drawing Sheets

(51) Int. Cl.
| | |
|---|---|
| *B01D 45/08* | (2006.01) |
| *B01D 46/10* | (2006.01) |
| *B01D 53/86* | (2006.01) |
| *B01F 3/04* | (2006.01) |
| *B01F 5/04* | (2006.01) |
| *B01F 5/06* | (2006.01) |
| *B21D 31/04* | (2006.01) |
| *F01N 3/20* | (2006.01) |
| *F01N 3/28* | (2006.01) |
| *B03C 3/36* | (2006.01) |

(52) U.S. Cl.
CPC .......... *B01D 53/86* (2013.01); *B01F 3/04049* (2013.01); *B01F 5/0451* (2013.01); *B01F 5/0693* (2013.01); *B03C 3/363* (2013.01); *B21D 31/04* (2013.01); *F01N 3/2066* (2013.01); *F01N 3/2892* (2013.01); *F01N 2240/20* (2013.01); *F01N 2330/12* (2013.01); *F01N 2330/38* (2013.01); *F01N 2570/14* (2013.01); *F01N 2610/02* (2013.01); *Y02T 10/24* (2013.01)

(58) Field of Classification Search
USPC .................. 422/176, 177; 55/523; 96/60
See application file for complete search history.

(56) References Cited

U.S. PATENT DOCUMENTS

| | | | |
|---|---|---|---|
| 4,301,098 A | 11/1981 | Mix | |
| 4,502,872 A | 3/1985 | Ivester et al. | |
| 4,714,055 A | 12/1987 | Sundheimer | |
| 5,540,897 A * | 7/1996 | Chu et al. | ............ 422/177 |
| 5,687,656 A | 11/1997 | Kaneko et al. | |
| 5,943,865 A * | 8/1999 | Cohen | ........ B01D 53/8631 110/345 |
| 6,120,580 A * | 9/2000 | Sandler | ........ B01D 53/346 423/238 |
| 6,401,449 B1 | 6/2002 | Hofmann et al. | |

OTHER PUBLICATIONS

International Search Report, International Application No. PCT/IB2011/001855, Completed Dec. 6, 2011, Authorized Officer Barnaby Hoyal.

European Office Action issued in connection with corresponding Application No. 10173432.5 on Sep. 24, 2012.

\* cited by examiner

GAS CLEANING SYSTEM HAVING A GAS FLOW RECTIFIER

This is a US National Phase application claiming priority to International Application No. PCT/IB2011/001885 having an International Filing Date of Aug. 16, 2011, incorporated herein in its entirety by reference.

TECHNICAL FIELD

The present disclosure relates to a gas cleaning system, such as a catalytic reduction system or an electrostatic precipitator system, for cleaning flue gas from an industrial process plant, such as a fossil-fueled power plant or a waste incineration plant. More particularly, the present disclosure relates to a gas cleaning system comprising a gas flow rectifier for diverting and rectifying gas flow to suppress gas flow turbulence.

BACKGROUND

In the combustion of a fuel such as coal, oil, peat, waste and the like in an industrial process plant such as a fossil-fuelled power plant, a hot process gas is generated. Such hot process gases contain, among other components, dust particles sometimes referred to as fly ash, and nitrogen oxides. Dust particles are often removed from process gas by means of a dust removal device such as an electrostatic precipitator (ESP) or a fabric filter (FF). An ESP system is disclosed in U.S. Pat. No. 4,502,872, incorporated herein in entirety by reference.

An industrial process plant may also be equipped with a selective catalytic reduction (SCR) reactor, which catalytically induces selective reduction of process gas nitrogen oxides. An SCR system is disclosed in WO 2005/114053 and U.S. Pat. No. 5,687,656 incorporated herein in entirety by reference. ESPs and SCRs are examples of gas cleaning devices useful in an industrial process plant gas cleaning system.

In such gas cleaning systems, a rectifier used to turn the gas flow as well as create an even velocity distribution may be arranged upstream with regard to process gas flow of gas cleaning devices such as ESPs, SCRs and/or FF. Rectifiers also suppress turbulence in flowing flue gas. Thereby, erosion phenomena typically occurring at the point where flue gas enters a gas cleaning device are reduced.

U.S. Pat. No. 7,063,817 describes a device for cleaning flue gas comprising a catalytic converter, with diverter walls and a rectifier placed upstream of the catalytic converter. The rectifier is placed at the point where the flue gas passage opens into the "catalyst tower", i.e. the duct in which the catalytic converter is placed. The purpose of the diverter walls is to ensure that flue gas flow is diverted into the catalyst tower. The purpose of the rectifier is to suppress turbulence in the flowing flue gas to reduce erosion phenomena at the point where the flue gas enters the catalytic converter. The rectifier is of a lamella design composed of lamellae made from sheet-metal strips arranged in parallel to flue gas flow.

Such a rectifier requires a significant amount of material for construction and adds a significant amount of weight to the support structure. Consequently, such a rectifier is relatively expensive to construct and erection thereof in a catalyst tower is rather complicated due to the relatively great weight of the rectifier.

SUMMARY

The present disclosure provides a system to alleviate at least some of the fore mentioned drawbacks associated with present gas cleaning systems.

According to the present disclosure, there is provided a gas cleaning system comprising a reactor duct, a gas cleaning device arranged in the reactor duct and a gas flow rectifier for rectifying flue gas flow, arranged in the reactor duct upstream of the gas cleaning device. The gas flow rectifier comprises at least one expanded screen.

An expanded screen suitable for use in the subject system is defined as a planar sheet of a substantially plastic deformable material with a plurality of apertures formed there through substantially perpendicular to the plane thereof.

More specifically, the apertures are formed between strands of the plastic deformable material. The strands of the plastic deformable material are worked so that at least a leading edge thereof extends outwardly above the plane of the overall planar sheet, such as at an angle of e.g. approximately 45 degrees with respect thereto, and at least an opposed trailing edge thereof extends outwardly below the plane of the overall planar sheet, such as at an angle of e.g. approximately 45 degrees with respect thereto, to form the present expanded screen.

By using the present expanded screen rectifier instead of the prior art parallel sheet metal strip lamellae rectifier, a rectifier of lower weight is achieved resulting in a more cost-efficient system, in terms of both construction costs and erection costs. Further, the present expanded screen rectifier achieves a rather uniform flue gas velocity distribution in its flow toward the gas cleaning device. An uneven gas flow velocity distribution may damage the gas cleaning device. Such damage may result from high velocity particles caught in the flue gas flow eroding the gas cleaning device portion fronting the flue gas flow. A more even flue gas velocity distribution also increases the dwell time, utilizing the full cross section of a catalyst layer of the gas cleaning device. Furthermore, a good incline angle for the flue gas towards the gas cleaning device is achieved, i.e. an incline angle close to 90 degrees. If the incline angle differs too much from 90 degrees the side of the gas cleaning device fronting the gas flow may be eroded. Still further, the present expanded screen contributes to increased mixing of flue gas with ammonium in the case where an ammonia injection grid is used upstream with regard to the flow of flue gas, of the rectifier. Consequently, using the present expanded screen rectifier, one uses less material, reduces system weight and reduces associated construction and erection costs.

According to another aspect, the at least one expanded screen is made of metal, for example steel. By using metal as the material for the expanded screen, a robust screen is achieved having a relatively long lifetime.

According to another aspect, the at least one expanded screen comprises a number of angled strands, with each angled strand having at least a portion thereof angled with respect to a planar side of the expanded screen. The expanded screen is arranged in the reactor duct such that the strands are angled to allow gas flow through the expanded screen to be rectified along the longitudinal axis of the reactor duct.

The planar side of the expanded screen is defined as the principal extension plane of the expanded screen. This principal extension plane will correspond to a plane of a flat plate, if such a plate would have been put in the same place and position as the expanded screen.

According to yet another aspect, the at least one expanded screen has a solidity value of between 0.2 and 0.7 with perpendicular light. Solidity is defined herein as the percentage of area cast into shadow when exposed to light at a specified angle.

According to yet another aspect, the at least one expanded screen comprises a first expanded screen and at least a second expanded screen, the second expanded screen positioned closer to the gas cleaning device than the first expanded screen. By using two or more parallel expanded screens, deflective effects are increased as compared to those using a single expanded screen. Further, using two or more parallel expanded screens, the flue gas velocity distribution is decreased as compared to using a single expanded screen. Hence, a more uniform flue gas velocity distribution is achieved.

According to still another aspect, the first expanded screen has a solidity higher than that of the second expanded screen, at least when considered at the same angle. Thereby, a good rectifying effect is achieved, such that flue gas flow contacts the gas cleaning device with an incident angle of approximately 90 degrees. Further, the flue gas velocity distribution of the flue gas entering the gas cleaning device is small. According to an example, the first expanded screen has a solidity value between 0.4 and 0.6 with perpendicular light and the second expanded screen has a solidity value between 0.3 and 0.5 with perpendicular light.

According to yet another aspect, the gas cleaning system further comprises a reactor inlet duct fluidly connected to the reactor duct and positioned upstream the reactor duct, the reactor inlet duct having a longitudinal axis diverted from the longitudinal axis of the reactor duct, and the gas flow rectifier is arranged for rectifying gas flow from the reactor inlet duct into the reactor duct.

In another aspect, the angled strands of the expanded screen are angled such that they are directed away from the longitudinal axis of the reactor inlet duct. By angling the strands away from flue gas flow flowing through the reactor inlet duct, the expanded screen diverts incoming flue gas flow coming from the reactor inlet duct to achieve maximum effect, in rectifying flue gas flow into the reactor duct, toward the gas cleaning device.

The above described systems are exemplified in more detail by the following figures and detailed description.

BRIEF DESCRIPTION OF THE DRAWINGS

Referring now to the figures, which are exemplary embodiments of the present system, wherein the like elements are numbered alike.

DESCRIPTION OF EMBODIMENTS

Figure 1:
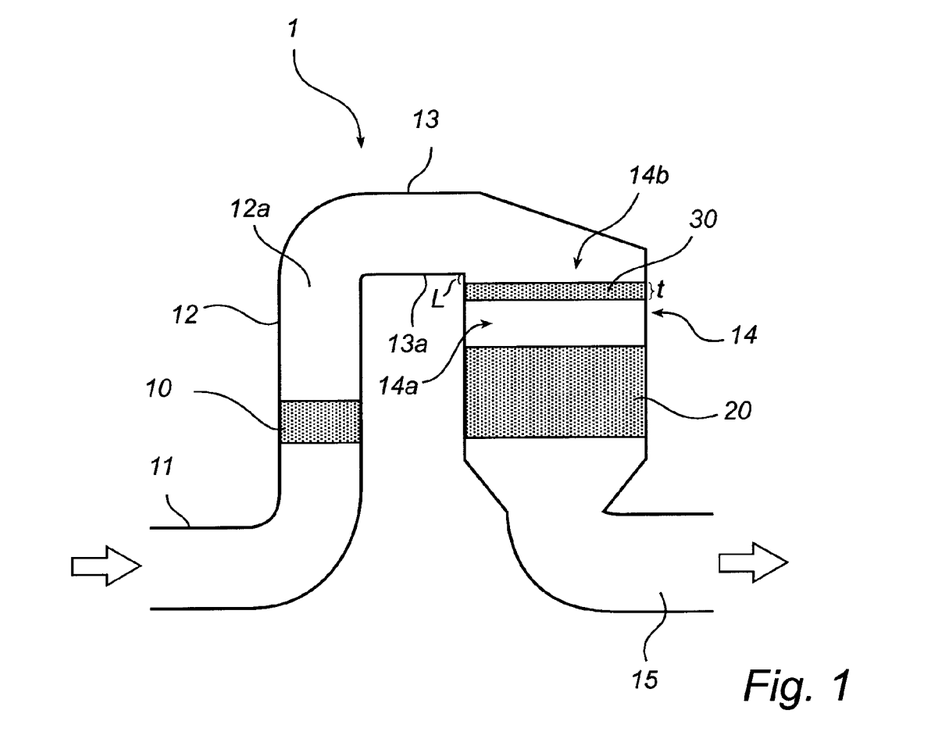
FIG. 1 is a schematic side view of an embodiment of a gas cleaning system of the present disclosure.

FIG. 1 illustrates a gas cleaning system 1 according to an embodiment of the present disclosure. The system comprises a substantially horizontal inlet duct 11 for flow of flue gas and particles formed in a burning process, such as a boiler (not shown), upstream with regard to flue gas flow from the inlet duct 11. Flue gas flows from the boiler through fluidly connected inlet duct 11 and through fluidly connected substantially vertical duct 12 downstream with respect to the flow of flue gas, of inlet duct 11. Optionally, an ammonia injection grid 10 may be arranged in interior 12a of the vertical duct 12 for injecting ammonia into flue gas flowing through the vertical duct 12. Ammonia so mixed with flue gas is useful in cleaning flue gas by improving the effectiveness of system gas cleaning device(s), such as a SCR. From the vertical duct 12, flue gas flows to a substantially horizontal longitudinal reactor inlet duct 13. Longitudinal reactor inlet duct 13 is fluidly connected to and downstream with respect to flue gas flow, of the vertical duct 12. Further, flue gas flows from the horizontal longitudinal reactor inlet duct 13 into a fluidly connected reactor duct 14, which is substantially vertical and perpendicular to the longitudinal axis of longitudinal reactor inlet duct 13. In interior 14a of reactor duct 14 is placed, in the case of an SCR gas cleaning device, a catalytic reactor 20 for selective catalytic reduction of nitrogen oxides.

Further, in interior 14a of reactor duct 14, upstream with respect to flue gas flow from the reactor 20, is a rectifier 30 in the form of an expanded screen 30a. In this embodiment the rectifier 30 is made of metal. The rectifier 30 is positioned across reactor duct 14 substantially parallel to the catalytic reactor 20. Hence, rectifier 30 is positioned in interior 14a of the reactor duct 14, substantially perpendicular to a longitudinal axis of reactor duct 14. For further clarity, rectifier 30 is positioned in reactor duct 14 such that the plane of the rectifier 30 is substantially perpendicular to the longitudinal axis of reactor duct 14. Further, the rectifier 30 is arranged in entry 14b of reactor duct 14. More particularly, rectifier 30 may be positioned within reactor duct 14 at a vertical distance l of an edge 13a of the longitudinal reactor inlet duct 13 that is similar to or less than the thickness, or height H, of the rectifier, alternatively, the distance of the edge 13a of the longitudinal reactor inlet duct 13 is approximately half of the thickness, or height of the rectifier. The edge 13a fluidly connects to entry 14b.

The catalytic reactor 20 may for example have three catalyst layers situated at a fixed distance apart from each other. The catalytic reactor 20 should be arranged suitably downstream with respect to flue gas flow of rectifier 30 such that flue gas flow is more or less free from turbulence and vortices when it enters the catalytic reactor 20. Turbulence and vortices arise due to flue gas passage through rectifier 30.

Upon flue gas exiting reactor duct 14, it enters a fluidly connected outlet duct 15. Flue gas flows through the outlet duct 15 to a stack (not shown) for release into the atmosphere.

The rectifier 30 may be produced from many different suitable materials, such as a metal. Examples of suitable metals are tempered sheet-metal, such as sheet iron or sheet steel, e.g. Hardox™ (SSAB Svenskt Stal Aktiebolag Corporation, Sweden), or stainless materials. Stainless materials are especially well suited for use in corrosive environments. By using metal to construct rectifier 30, a robust expanded screen is achieved with a rather long lifetime. The non-flexible construction material of rectifier 30 may also be a ceramic material or a polymeric material, a kind of rigid plastics, such as Teflon™ (E.I. Du Pont De Nemours and Company Corporation, USA).

Figure 2A:
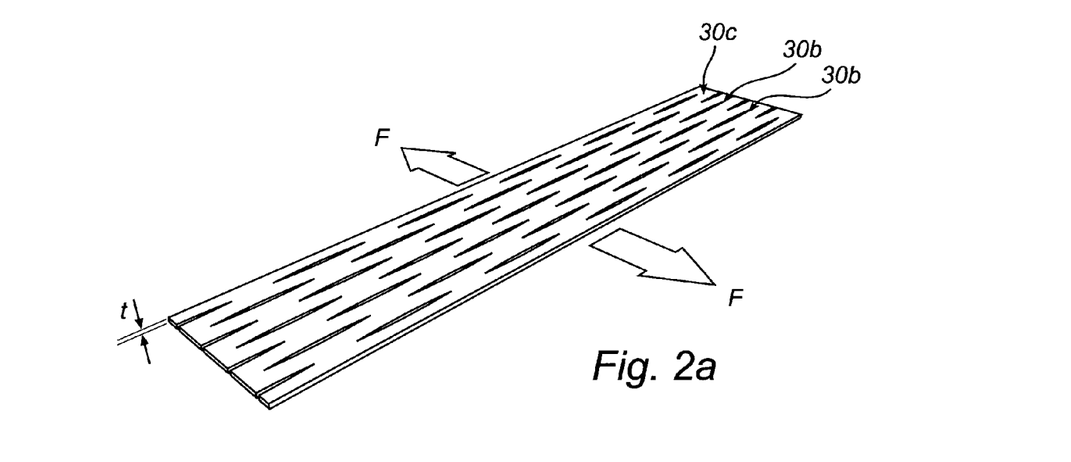
FIG. 2a is a perspective view of a sheet material used for manufacturing an expanded screen.
Figure 2B:
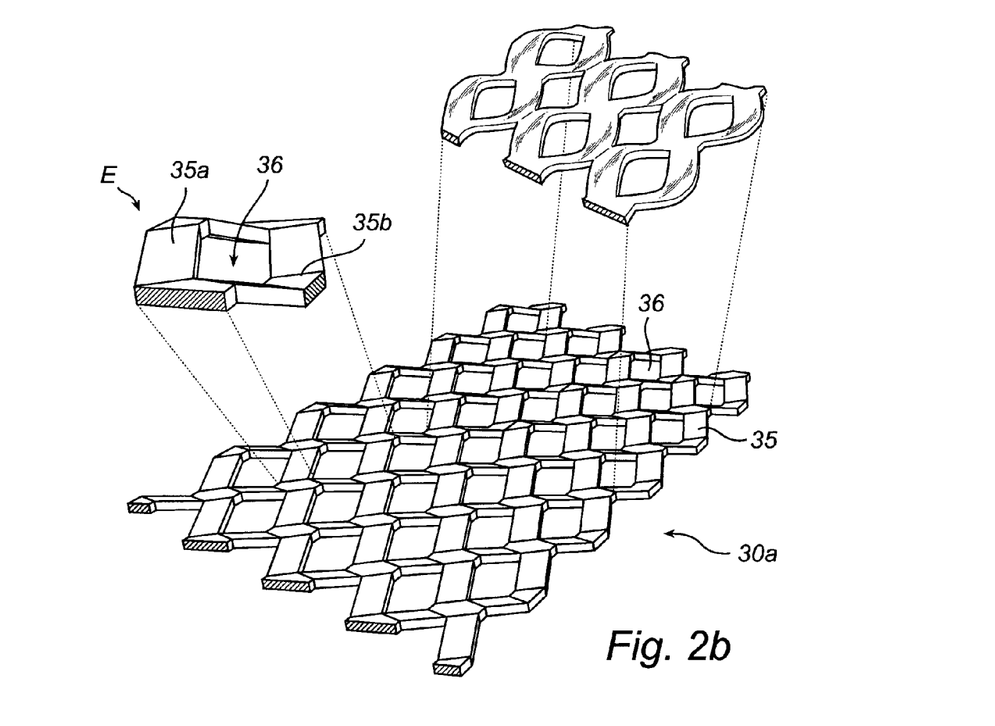
FIG. 2b is a perspective view of a part of an expanded screen.

Rectifier 30 in the form of an expanded screen 30a, and how to create such a rectifier from a plane of sheet material, is illustrated in figures 2a and 2b. To create an expanded screen, a shearing knife is used to create a pattern of cuts 30b perpendicularly with respect to a plane of sheet material 30c, through the thickness t of the sheet material 30c to be used to construct rectifier 30. While creating cuts 30b or after cuts 30b have been created, the sheet material 30c is stretched (arrows marked F), thus deforming both the cuts 30b made by the knife, and the sheet material 30c. The result (see FIG. 2b) is a pattern of angled strands 35 with apertures 36 between the angled strands 35. In other words, the angled strands 35 of the expanded screen 30a are intermittently angled with respect to the plane of sheet material 30c. These angled strands 35 give the expanded screen 30a desirable flue gas deflection properties as required for operation as a rectifier 30. Desirable flue gas deflection properties are defined herein as being able to turn flue gas flow, e.g. into approximately the direction of the duct positioned downstream in respect of the expanded screen. A perforated plate for example would not have desirable gas deflection properties due to its lack of angled elements. A perforated plate would not turn the flow, it may only even out a skewed velocity profile, due to pressure drop over the plate. Angle α between plane X of sheet material 30c and the angled strands 35 is illustrated in FIG. 3.

Figure 3:
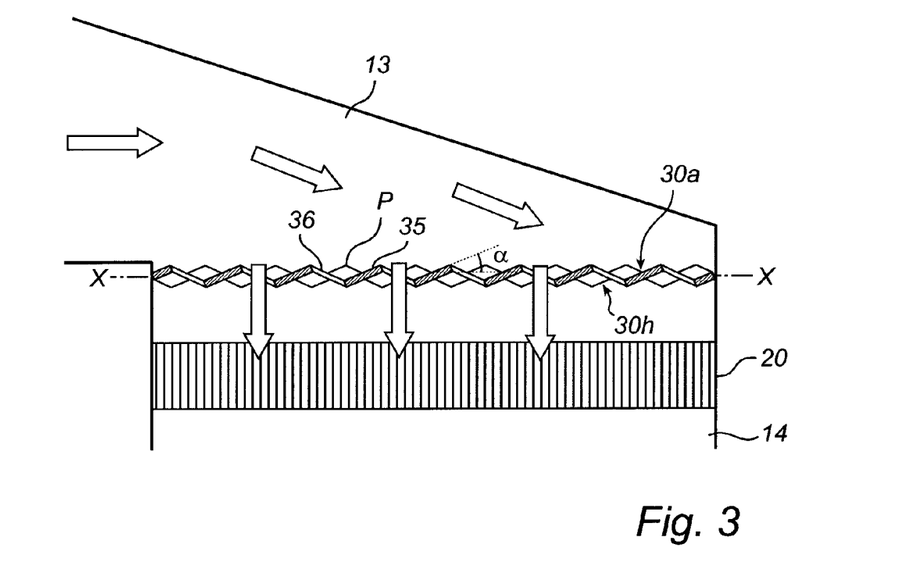
FIG. 3 is a schematic side view of a part of an embodiment of a gas cleaning system of the present disclosure.

As illustrated in FIG. 3, expanded screen 30a is arranged in reactor duct 14 perpendicular to the longitudinal axis of reactor duct 14 so that the apertures 36 defined by the angled strands 35 are not directly aligned with flue gas flow. Thereby, the angled strands 35 of expanded screen 30a impacts flowing flue gas to a high degree. If expanded screen 30a were to be installed at an angle within reactor duct 14 so that apertures 36 are directly aligned with flue gas flow, the angled strands 35 would impact flowing flue gas to a low degree. In other words, the angled strands 35 are angled to increase contact surface area directly aligned with flue gas flow as compared to that of unangled strands surrounding an opening.

The production method used to create expanded screen 30a causes sheet material 30c to deform to create several different measurable features and angles. A wide variety of differing expanded screen 30a types may be produced by creating cuts 30b further apart or closer together, by using sheet material 30c of different thicknesses or by creating cuts 30b of different lengths. Depending on the degree to which sheet material 30c is stretched after creating the pattern of cuts 30b, the expanded screen 30a visibly varies, e.g. changes solidity (described in more detail below). The process of producing expanded screens 30a produces very little, if any, waste material and a relatively small amount of sheet material 30c can produce a fairly large area of expanded screen 30a.

By studying expanded screen 30a, a pattern of interconnected angled strands 35 defining apertures 36, i.e., an "element", emerges to form expanded screen 30a. An element E is defined as an aperture 36 in the expanded screen 30a together with the angled strands 35 surrounding aperture 36. Elements E axe illustrated in FIG. 2 and in FIG. 4.

Figure 4:
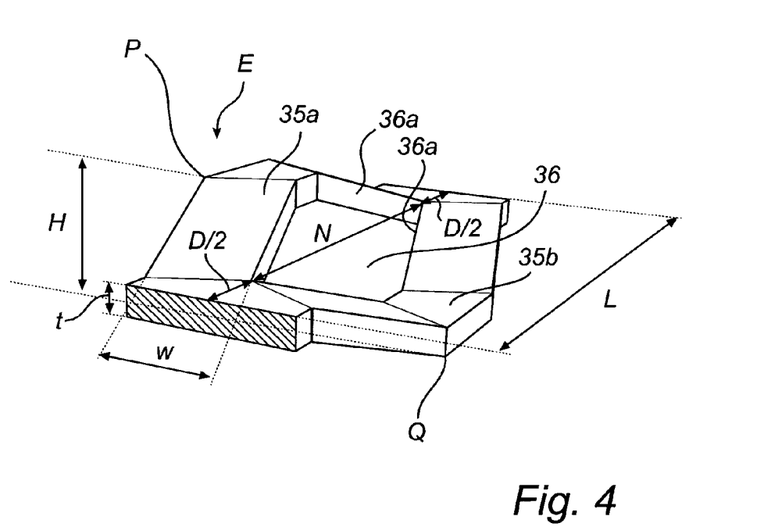
FIG. 4 is a perspective view of an element of an expanded screen.

As illustrated in FIG. 4, each element E is made up of two angled strands 35a and 35b. One angled strand 35a is angled upwardly from plane X of sheet material 30c and the other angled strand 35b is angled downwardly from plane X of sheet material 30c. Together, angled strands 35a and 35b turn element E into somewhat of a loop with aperture 36 surrounded by angled strands 35a and 35b at a fixed angle α. FIG. 3 illustrates angle α of angled strand 35a as compared to plane X of the sheet material 30c. The angled strands 35 have thickness t and width W, where t is approximately the original thickness of sheet material 30c. Expanded screens 30a with larger widths W prove to have increased deflection properties over those with smaller widths W. Element E also has a length L and a height H. Element E length L is determined by measuring the length N of an aperture 36 in the same direction as the cuts 30b plus the distance D between nearby lying apertures 36. Element height, or expanded screen 30a height H is determined by measuring the distance from the lowest point Q of angled strand 35b to the highest point P of angled strand 35a. Height H may be modified by stretching the cut sheet material 30c to a lesser degree for a lesser height H or by stretching the cut sheet material 30c to a greater degree for a greater height H. Further, edges 36a of apertures 36 may be varied depending on the cutting edge of the tool used to create cuts 30b. The cutting edge of the tool or knife used to create cuts 30b defines the shape of the angled strands 35.

To determine expanded screens 30a most suitable for use as rectifiers 30 in gas cleaning systems, a measurable value defining the amount of contact surface area or "blockage" is required. This measurable value is referred to herein as solidity σ. Solidity σ is expressed as a fraction of the full area of a planar side 30h of expanded screen 30a that is occupied by angled strands 35. Solidity σ is theoretically defined as the percentage of area of the planar side 30h casting a shadow when exposed to a light source of a particular angle to the planar side 30h.

The complex structure of the expanded screen 30a makes solidity σ harder to measure as compared to measuring other types of screens. By changing the degree of angle α of angled strands 35 with respect to planar side 30h, solidity is significantly affected.

Each expanded screen 30a therefore has a different solidity σ depending on angle α, distance D, length L, height H, width W and thickness t. While solidity measures the area of contact by angled strands 35 of flue gas flow, it is sometimes more appropriate to measure the amount of open area or aperture 36 area of the expanded screen 30a. This measurable value is referred to herein as the porosity β of the expanded screen 30a. Porosity is calculated as β=1−σ, where β is porosity and σ is solidity.

Figures 5A, 5B, 6A, 6B:
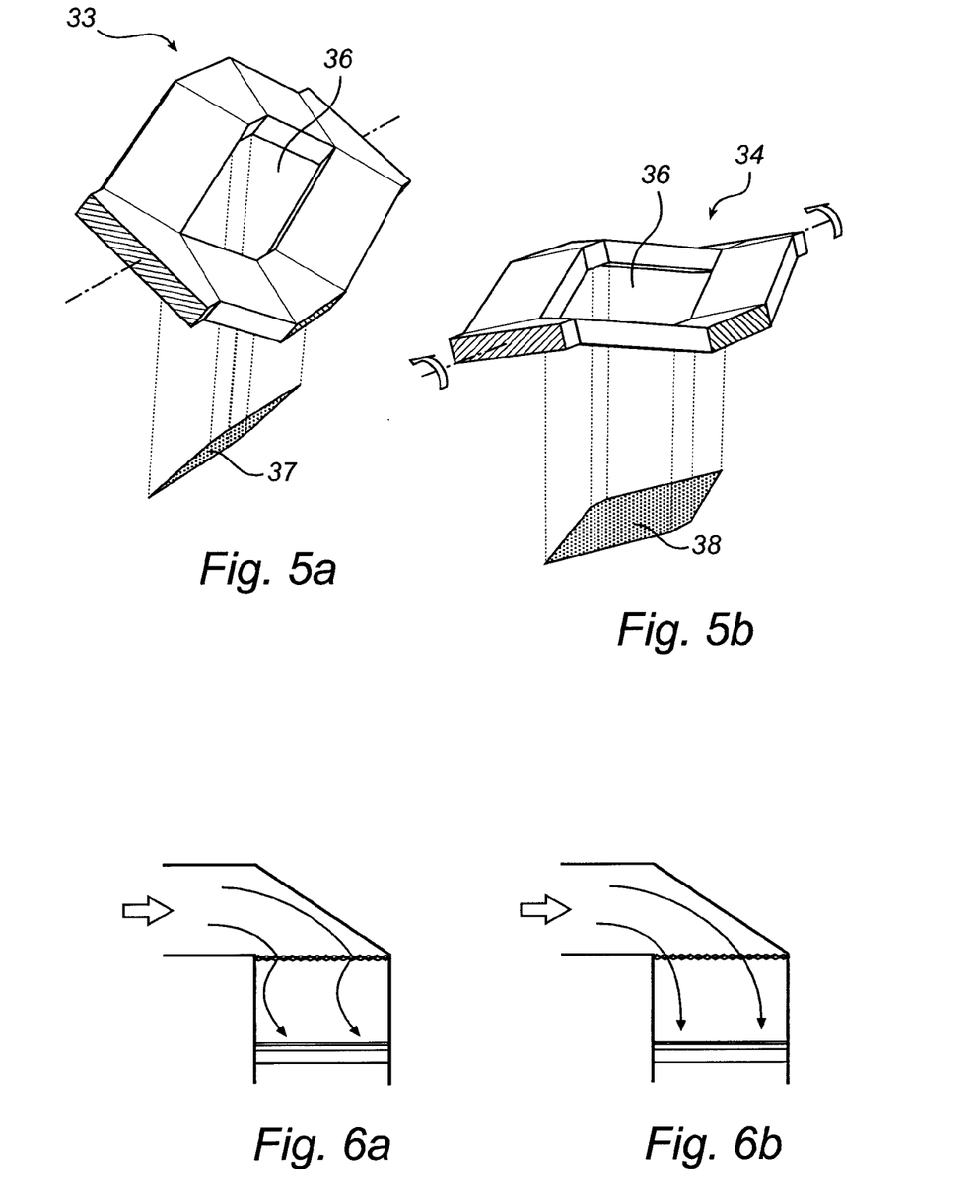
FIGS. 5a and 5b are perspective views of an element of an expanded screen, the figures illustrating theoretical determination of solidity.
FIGS. 6a and 6b are schematic side views of a part of a gas cleaning system, illustrating gas flow through expanded screens having differing solidity values.

FIG. 5a illustrates element E-33 of an expanded screen 30a having a relatively high solidity σ. Shaded area 37 below the element E-33 depicts the area of light passing through aperture 36 when planar side 30h is exposed to a light source casting light perpendicular to planar side 30h. As illustrated in FIG. 5a, this area of light 37 is relatively small, indicating a relatively low porosity β and a relatively high solidity σ.

FIG. 5b illustrates element E-34 having a relatively low solidity σ. Shaded area 38 below the element E-34 depicts the area of light passing through aperture 36 when planar side 30h is exposed to a light source casting light perpendicular to planar side 30h. As illustrated in FIG. 5b, this area of light 38 is relatively large, larger than the area 37, indicating a relatively high porosity β and a relatively low solidity σ. Accordingly, the solidity σ of the element E-33 is higher than the solidity σ of the element E-34.

FIG. 6a illustrates expanded screen 30a of relatively high solidity σ causing a relatively large flue gas deflection upon flow of flue gas through apertures 36 of expanded screen 30a. FIG. 6b illustrates expanded screen 30a of relatively low solidity σ causing a relatively small flue gas deflection upon flow of flue gas through apertures 36 of expanded screen 30a.

According to an embodiment, the expanded screen 30a of FIG. 3 has a solidity σ between 0.2 and 0.7.

Figure 7:
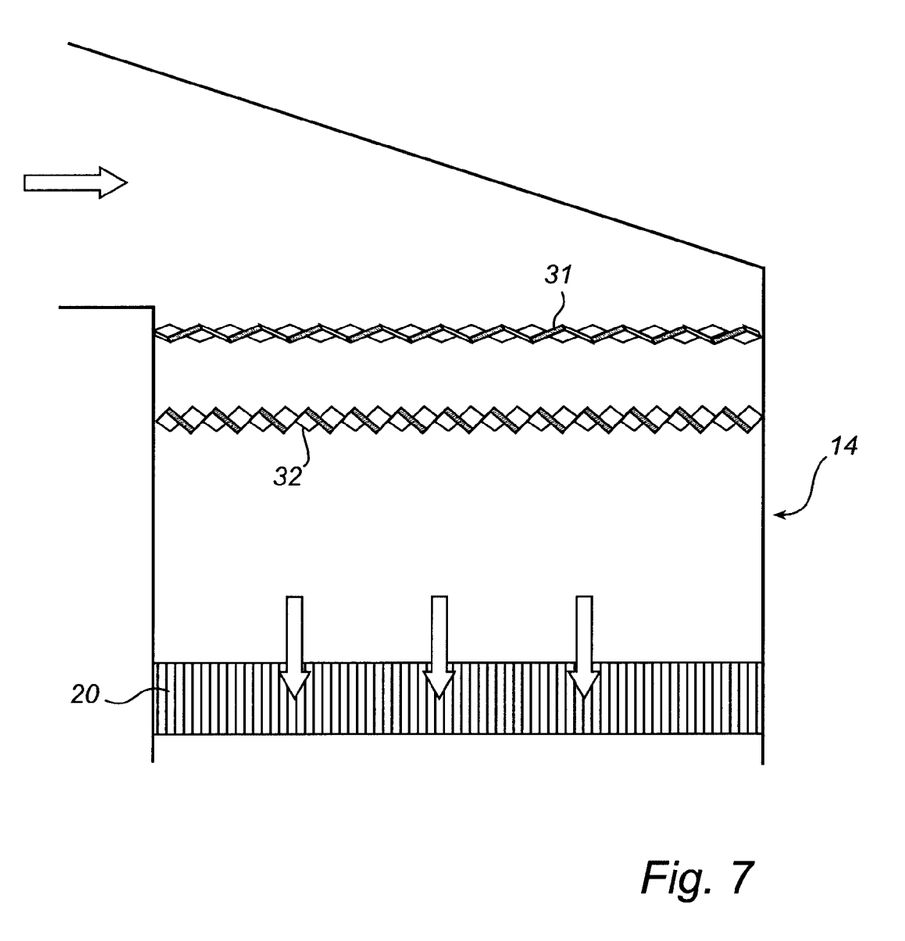
FIG. 7 is a schematic side view of another embodiment of a gas cleaning system of the present disclosure, the system having two expanded screens.

FIG. 7 illustrates an embodiment of a gas cleaning system 1 comprising two expanded screens 30a, a first screen 31 and a second screen 32 arranged in reactor duct 14 perpendicular to the longitudinal axis of reactor duct 14 upstream with respect to flue gas flow of gas cleaning device 21, such as catalytic reactor 20. As noted, expanded screens 31 and 32 are arranged across reactor duct 14 perpendicular to the longitudinal axis of reactor duct 14. Further, the expanded screens 31 and 32 are each arranged proximal to the other in reactor duct 14 such that the second expanded screen 32 is closer to the catalytic reactor 20 than is the first expanded screen 31. Thus, flue gas flows through apertures 36 of expanded screen 31 prior to flowing through apertures 36 of expanded screen 32.

Further, the second expanded screen 32 is preferably placed a distance at least as far away downstream with regard to the flow of flue gas, from the first expanded screen 31 as required for the rectifying effect of first expanded screen 31 on flue gas flow to be completed prior to flue gas flowing through apertures 36 of the second expanded screen 32. For purposes of the present application, rectifying effects of expanded screens 30a are completed when flue gas flow is more or less free from vortices and turbulences. The distance between the first expanded screen 31 and the second expanded screen 32 may also be determined or adjusted in centimeters depending upon the dimensions of reactor duct 14, solidity σ of the first expanded screen 31, solidity σ of the second expanded screen 32 which may be the same or different from that of the first expanded screen 31, etc.

The first expanded screen 31 of FIG. 7 is arranged in reactor duct 14 such that its apertures 36 are blocked by its angled strands 35 from direct flue gas flow. Thereby, the angled strands 35 of the first expanded screen 31 are directly impacted by and interact with flue gas flow to relatively a high degree. This means that the angled strands 35 of the first expanded screen are angled α such that angled strands 35 have a relatively large contact surface area directly impacted by flue gas. The second expanded screen 32 of FIG. 7 is installed in the reactor duct 14 and has angled strands 35 of angle α such that flue gas flowing through apertures 36 of the first expanded screen 31 are impacted also by the angled strands 35 of the second expanded screen 32. In total, the first and the second expanded screen contribute to a rectified flue gas flow having a requested flow direction.

According to an embodiment, the first expanded screen 31 of FIG. 7 has a solidity σ greater than the solidity σ of the second expanded screen 32. The first expanded screen 31 may thus have a "middle to high" solidity α, i.e. a solidity in the range of 0.3 to 0.8, while the second expanded screen 32 may have a "low" solidity σ, i.e. a solidity in the range of 0.1 to 0.3.

According to another embodiment, rectifier 30 may comprise a plurality of expanded screens 30a arranged in reactor duct 14, each in relatively close proximity to the others and each arranged substantially perpendicular to the longitudinal axis of reactor duct 14. For example, there may be 3, 4 or 5 expanded screens 30a arranged one after the other within reactor duct 14. In an embodiment, each of the expanded screens 30a has a different solidity σ. In another embodiment, two or more of the expanded screens have the same solidity σ.

While the invention has been described with reference to various exemplary embodiments, it will be understood by those skilled in the art that various changes may be made and equivalents may be substituted for features thereof without departing from the spirit and scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A gas cleaning system comprising:
   a vertical duct comprising an ammonia injection grid arranged horizontally across the vertical duct operative for an upward flow of a flue gas through both the vertical duct and the ammonia injection grid;
   a vertical reactor duct fluidly connected to the vertical duct for a downward flow of the flue gas therethrough;
   a catalytic reactor gas cleaning device arranged horizontally across the vertical reactor duct operative for the downward flow of the flue gas therethrough; and
   a gas flow rectifier comprising at least one planar expanded screen for rectifying flue gas flow comprising a plurality of angled strands alternating between an angled strand angled upwardly to a highest point from a plane of the gas flow rectifier and an angled strand angled downwardly to a lowest point from the plane of the gas flow rectifier with angle, distance, length, height, width, and thickness of the plurality of angled strands defining a solidity of the gas flow rectifier ranging from 0.1 to 0.8, arranged at an entry of the vertical reactor duct with the plane of the gas flow rectifier arranged horizontally across, vertically above, upstream of, and parallel to the catalytic reactor gas cleaning device.

2. A gas cleaning system according to claim 1, wherein the at least one expanded screen is made of metal.

3. A gas cleaning system according to claim 1, wherein the at least one expanded screen has a planar side substantially perpendicular to a longitudinal axis of the vertical reactor duct.

4. A gas cleaning system according to claim 1, wherein each angled strand has at least a portion thereof angled with respect to a planar side of the expanded screen.

5. A gas cleaning system according to claim 1, wherein the solidity of the at least one expanded screen is between 0.2 and 0.7.

6. A gas cleaning system according to claim 1, wherein the at least one expanded screen comprises a first expanded screen and at least a second expanded screen, the second expanded screen positioned closer to the catalytic reactor gas cleaning device than the first expanded screen.

7. A gas cleaning system according to claim 6, wherein the second expanded screen is distanced from the first expanded screen for reduction of flue gas flow turbulence prior to contacting the second expanded screen.

8. A gas cleaning system according to claim 6, wherein the solidity of the first expanded screen is higher than that of the second expanded screen.

9. A gas cleaning system according to claim 6, wherein the solidity of the first expanded screen is between 0.4 and 0.6 and the solidity of the second expanded screen is between 0.3 and 0.5.

10. A gas cleaning system according to claim 6, wherein the at least one expanded screen comprises a plurality of expanded screens arranged in parallel across a longitudinal axis of the vertical reactor duct.

11. A gas cleaning system according to claim 1, further comprising a reactor inlet duct positioned upstream the vertical reactor duct, the reactor inlet duct having a longitudinal direction diverted from the longitudinal direction of the vertical reactor duct, wherein the gas flow rectifier is arranged for rectifying gas flow from the reactor inlet duct into the vertical reactor duct.

12. A gas cleaning system according to claim 11, wherein the at least one expanded screen comprises angled strands angled such that they are directed away from the longitudinal axis of the reactor inlet duct.

13. A gas cleaning system according to claim 11, wherein the at least one expanded screen is arranged substantially perpendicular to a longitudinal axis of the vertical reactor duct.

* * * * *